United States Patent [19]

Nubel et al.

[11] Patent Number: 5,621,047
[45] Date of Patent: *Apr. 15, 1997

[54] PROCESS FOR PREPARING LINEAR MONOFUNCTIONAL AND TELECHELIC DIFUNCTIONAL POLYMERS AND COMPOSITIONS OBTAINED THEREBY

[75] Inventors: Philip O. Nubel; Howard B. Yokelson; Steven A. Cohen; William G. Bouslog, all of Naperville, Ill.

[73] Assignee: Amoco Corporation, Chicago, Ill.

[ * ] Notice: The portion of the term of this patent subsequent to Jun. 2, 2015, has been disclaimed.

[21] Appl. No.: 543,080

[22] Filed: Oct. 13, 1995

Related U.S. Application Data

[63] Continuation-in-part of Ser. No. 68,236, May 27, 1993, Pat. No. 5,403,904, and a continuation-in-part of Ser. No. 68,240, May 27, 1993, Pat. No. 5,519,101, and a continuation-in-part of Ser. No. 167,668, Dec. 15, 1993, Pat. No. 5,512,635.

[51] Int. Cl.$^6$ .................................................. C08G 61/12
[52] U.S. Cl. .................. 525/247; 525/269; 525/270; 525/309; 525/310; 526/136; 526/139; 526/140; 526/141; 526/142; 526/166; 526/169; 526/169.1; 526/169.3; 526/281; 526/308; 526/309
[58] Field of Search .................... 526/136, 139, 526/140, 141, 142, 281, 308, 329.1, 336, 166, 169, 169.1, 169.3, 309; 525/247, 269, 270, 309, 310; 528/501

[56] References Cited

U.S. PATENT DOCUMENTS

| | | | |
|---|---|---|---|
| 3,798,175 | 3/1974 | Streck et al. | 526/308 X |
| 3,857,825 | 12/1974 | Streck et al. | 526/308 X |
| 4,080,491 | 3/1978 | Kobayashi et al. | 526/308 X |
| 4,095,033 | 6/1978 | Küpper | 526/308 X |
| 4,950,826 | 8/1990 | Zerpner et al. | 526/308 X |

*Primary Examiner*—Fred Teskin
*Attorney, Agent, or Firm*—William C. Clarke; Wallace L. Oliver

[57] ABSTRACT

This invention relates to a process for preparation of non-crosslinked linear monofunctional and telechelic difunctional unsaturated polymers wherein the functional groups are acrylate or methacrylate groups. The average functionality number of the monofunctional unsaturated polymers is at least 0.7, as determined by nuclear magnetic resonance spectroscopy (NMR). The average functionality number of the telechelic difunctional polymers is at least 1.7, as determined by NMR. Alkyl acrylates or alkyl methacrylates are reacted with cyclic olefinic non-conjugated compounds or unsaturated hydrocarbon polymers to prepare monofunctional and difunctional polymers. The process is substantially free of side reactions comprising double bond migration and cyclization.

14 Claims, No Drawings

PROCESS FOR PREPARING LINEAR MONOFUNCTIONAL AND TELECHELIC DIFUNCTIONAL POLYMERS AND COMPOSITIONS OBTAINED THEREBY

This is a Continuation-in-Part of application Ser. No. 08/068,236, filed May 27, 1993, now U.S. Pat. No. 5,403,904, application Ser. No. 08/068,240 now U.S. Pat. No. 5,579,101 filed May 27, 1993 and application Ser. No. 08/167,668 filed Dec. 15, 1993 now U.S. Pat. No. 5,512,635.

FIELD OF THE INVENTION

This invention relates to an olefin metathesis process for preparing non-crosslinked linear monofunctional and telechelic difunctional polymers wherein the chain terminal groups are functional reactive groups, and to compositions obtained thereby. The functional reactive groups are ester groups such as acrylate and methacrylate groups. The process uses olefin cross-metathesis reactions wherein monofunctional acyclic olefinic compounds selected from the group consisting of alkyl acrylates and alkyl methacrylates are reacted with a cyclic olefinic non-conjugated compound or an unsaturated hydrocarbon polymer in the presence of a catalyst comprising a transition metal compound, an organic tin compound or aluminum halide and an organic Lewis base to prepare a linear monofunctional or difunctional polymer. Undesired side reactions such as double bond migration are minimized by the selected catalyst.

Accordingly, this invention relates to preparation of non-crosslinked monofunctional polymers and telechelic difunctional polymers by cross-metathesis reaction wherein one olefinic compound reactant is a long chain acyclic unsaturated hydrocarbon polymer or a cyclic olefinic non-conjugated compound, and the other reactant is a acyclic olefinic compound reactant having at least one terminal functional group selected from the group consisting of an acrylate group and a methacrylate group. This invention also relates to non-crosslinked monofunctional polymers and telechelic difunctional polymers prepared by the process of this invention.

BACKGROUND OF THE INVENTION

Although the preparation of monomeric unsaturated mono- and difunctional compounds, such as mono- and dicarboxylic acid esters by an addition reaction of an olefin with a mono- or dicarboxylic acid ester is well known, as is taught in U.S. Pat. No. 3,783,136, the preparation of linear alpha, omega difunctional polymers by an olefin metathesis reaction typically has been limited to a few special cases where the reaction is specific for a certain few reactants.

The disproportionation or metathesis of olefins is a reaction in which one or more olefinic compounds are transformed into other olefinic compounds of different molecular weights. The disproportionation of an olefin to produce an olefin of higher molecular weight and an olefin of lower molecular weight can be a self-disproportionation reaction as propylene to ethylene and butene, or cross-disproportionation of two different olefins to produce still other olefins, also termed cross-metathesis of olefins.

The utility of the olefin disproportionation reaction, commonly termed an olefin metathesis reaction, has been recognized as a means to obtain olefinic compounds bearing functional reactive groups such as esters, ethers, halogens and others. However, inasmuch as the olefin metathesis reaction is an equilibrium reaction of unsaturated compounds, the usual consequences of an equilibrium reaction can be present, i.e., yields of the desired product can be low unless a suitable means of driving the reaction to completion can be utilized. Also, the catalyst present for the olefin metathesis reaction can initiate by-product reactions. The reverse of the olefin metathesis reaction can occur wherein the reaction products self-metathesize to form other olefinic compounds. Terminal olefins nave been found to self-metathesize rapidly such as in the industrial process for conversion of propylene to other products. The cis-trans configuration of the final product may be predominantly trans, or predominantly cis, or a mixture of cis-trans, depending upon reaction conditions, including the catalyst utilized.

The disproportionation of olefins bearing functional groups is an especially economically useful reaction in that compounds bearing functional groups are valuable for use in polymer formation and chemical transformations to yield industrially valuable products. Examples of functional reactive groups previously available are esters, alcohols, amines, halides. Monofunctional and difunctional hydrocarbon polymers of olefinic compounds having at least one internal carbon-to-carbon double bond wherein the functional groups are acrylates or methacrylates have not been previously available by disproportionation of olefins.

Polymers having terminal functional endgroups can be further reacted to form telechelic difunctional polymers. Telechelic polymers having functional groups useful for further reactions, i.e., cross-linking reactions or the construction of other defined polymer structures such as block copolymers, etc., are of great interest from the viewpoint of possible applications. A halogen-terminated polymer can be reacted with a unilaterally metal-terminated chain of another polymer to produce block copolymers. Hydroxy-terminated polymer chains can be reacted with di-and/or tri- polyisocyanates and/or analogous polyfunctional compounds such as acid chlorides of polybasic acids. Ester-terminated polymer chains can be reacted with alcohols or other reactive functional groups for adhesive, coating, fiber, foam and other applications.

Monofunctional and telechelic difunctional polymers have been prepared in the past by termination of living polymers with anionic, cationic and metathesis polymerizations of cyclic olefins. Metathesis polymerizations of cyclic olefins can restrict the availability of products to those which can be prepared from a relatively few cyclic olefins, typically of from about 5 to about 9 carbon atoms. Functional groups in monofunctional and difunctional polymers derived from cyclic olefins can be limited to those present in the precursor cyclic olefinic compounds. With acyclic olefins, the olefin metathesis reaction can result in cleavage and reforming of carbon-to-carbon double bonds. The resulting redistribution of alkylidene moieties leads to a random product distribution at equilibrium (Kirk-Othmer, *Ency. Chem. Tech.*, 3rd ed., 8 (597). Telechelic difunctional hydrocarbon polymers produced via anionic or free-radical polymerizations of acyclic olefins typically are mixtures of polymer structures. For example, alpha-omega difunctional polybutadienes prepared by anionic or free-radical polymerization of butadiene contain mixtures of 1,4- and 1,2-polybutadiene structures, have molecular weights of 1000–4000 and are terminated with hydroxy or carboxy functionalities. Typically, the functionalities are less than difunctional, the functionality number (Fn) being less than 2; or greater than difunctional, the functionality number being greater than 2,and the products are mixtures of monofunctional, difunctional, trifunctional, and non-functional species.

This invention accordingly relates to a process for preparation of non-crosslinked linear telechelic oligomers and polymers of high difunctional purity by olefin metathesis reaction. The product of the reaction can be further reacted to prepare difunctional alcohols, acids and amines.

The linear acyclic functional olefinic compound product is prepared by reacting a monofunctional acyclic olefinic compound selected from the group consisting of alkyl acrylates and alkyl methacrylates with a second olefin in a cross metathesis reaction wherein the second olefin is selected from the group consisting of a cyclic olefinic non-conjugated compound of from 4 to 30 carbon atoms and an acyclic unsaturated hydrocarbon polymer of number average molecular weight of up to about 1,000,000. The product of the reaction between the monofunctional olefinic compound and a second olefinic compound can be a mixture of species; i.e., monofunctional, difunctional and nonfunctional. Conversion of reactants is at least 10% of theoretical based on olefinic compound reactants.

The invented process utilizes a catalyst composition comprising (a) a transition metal chloride, oxyhalide, oxide or ammonium salt, (b) an organic tin compound or aluminum halide reagent, and (c) an organic Lewis base, wherein undesired side reactions such as double bond migration are minimized.

The non-reactivity of certain unsaturated compounds such as alkyl acrylates and alkyl methacrylates in the olefin metathesis reaction, i.e., methyl methacrylate, has been documented, K. J. Ivin, *Olefin Metathesis*, Academic Press, London, N.Y., (1983), 151. Dialkyl maleates or fumarates have been reported to be virtually unreactive in olefin metathesis reactions, Verkuijlen, et al. *Recl. Trav. Chim., Pays-Bas* (1977), 96, M86. However, dimethyl-3-hexene-1, 6-dioate, which is costly and is not commercially available in bulk quantities, has been reported to cross-metathesize with 1,5-cyclooctadiene, Reyx, et al. *Makromol. Chem.* (1982), 183, 173–183, cyclopentene, Reyx, et al., *J. Molecular Catal.*, (1986), 36, 101–105, or norbornene, and has been shown to yield oligomers/polymers which are not high in difunctional purity, Cramall, et al., *J. Molecular Catal.*, (1991), 65, 193–203.

Surprisingly, it has been found that linear functional acyclic olefinic compounds comprising monofunctional unsaturated polymers containing groups such as acrylates and methacrylates can be prepared in the presence of the catalyst composition of the instant invented process in cross-metathesis reactions of alkyl acrylates or alkyl methacrylates with acyclic or cyclic olefinic non-conjugated compounds.

In the process of the instant invention, in the presence of reactants comprising cyclic olefinic non-conjugated compounds and polymeric olefinic compounds with functional olefinic compounds such as acrylates or methacrylates, linear difunctional telechelic unsaturated polymers are prepared with at least one internal carbon-to-carbon double bond and ester groups such as acrylate or methacrylate terminal groups. These linear non-crosslinked difunctional telechelic unsaturated polymers with reactive terminal groups are suitable for further functionalization or incorporation into other polymers for preparation of block copolymers and other products.

The linear nonocrosslinked difunctional telechelic unsaturated polymers prepared by the process of this invention are true linear compounds of strictly regular structure with exactly defined terminal groups. Such polymers with acrylate or methacrylate endgroups have not heretofore been produced.

Although acyclic unsaturated compounds containing functional groups have been prepared by the olefin metathesis reaction, it has been indicated that when the functional group is too close to the double bond, the metathesis reaction does not work. The non-reactivity of methyl methacrylate has been ascribed to this, K. J. Ivin *Olefin Metathesis*, Academic Press, London, N.Y., (1983), 149–151. It has been found that in the process of the instant invention, olefinic compounds such as methyl methacrylate can be reacted to prepare monofunctional and telechelic difunctional oligomers or polymers by olefin metathesis reactions.

As is well known, side reactions can occur during olefin metathesis reactions. These side reactions include alkylation, isomerization, cyclization and addition across double bonds present in the molecular structure. Surprisingly, it has been found that in cross-metathesis reactions under the conditions of the present invention, these side reactions are minimal. The average functionality number of monofunctional polymers prepared by the process of this invention is at least 0.7 as determined by nuclear magnetic resonance spectroscopy (NMR). The average functionality number of telechelic difunctional polymers prepared by the process of this invention is at least 1.7, as determined by nuclear magnetic resonance spectroscopy (NMR).

DESCRIPTION OF THE PRIOR ART

Previous procedures to prepare polymeric hydrocarbons having reactive functional terminal groups other than double bonds frequently have utilized cyclic olefinic compounds in conjunction with a ring opening step. Ofstead, U.S. Pat. No. 3,597,403, teaches a process for ring-opening polymerization of unsaturated alicyclic compounds in the presence of a catalyst system comprising an alkylaluminum halide, molecular oxygen, and a compound of tungsten or molybdenum. Streck, et al., U.S. Pat. No. 3,798,175 teaches a process for ring opening polymerization of cyclic olefins and forming terminal carbalkoxy groups by employing a catalyst system consisting essentially of (1) a tungsten or molybdenum compound, (2) an organoaluminum compound, (3) an unsaturated carboxylic acid ester. Streck '175 teaches that an unsaturated carboxylic acid ester containing at least one carbon-carbon double bond varies the molecular weight of the resulting polymer by reaction with the double bond of the ring-opened cyclic olefin to produce side chains. Streck, et al, U.S. Pat. No. 3,857,825, discloses a similar reaction in the presence of a polymeric hydrocarbon having an unsubstituted non-conjugated ethylene double bond for production of polymeric hydrocarbons having reactive silyl end groups by a ring-opening polymerization of a cyclic olefin in the presence of a catalytic amount of a halogenated compound of a metal selected from the group consisting of niobium, tantalum, molybdenum, tungsten and rhenium and a halogen, alkoxy, carboxylate or Lewis acid.

Accordingly, although the prior art teaches the preparation of polymeric hydrocarbons having functional end groups such as esters, amines, hydroxyls and other reactive groups, investigators have continued to search for an olefin metathesis process and catalyst for preparation of non-crosslinked difunctional oligomers and polymers with high difunctional purity and having an average functionality of at least 1.7, as determined by NMR, from monofunctional reactants selected from the group consisting of alkyl acrylates and alkyl methacrylates wherein the alkyl group contains from 1 to 12 carbon atoms.

Wagener, et al. *Makromol. Chem.* 191, 365–374 (1990) reported a successful acylic diene metathesis polymerization wherein vinyl terminated oligo(octenylene)s were synthesized using a Lewis acid-free catalyst, W(CH-t-Bu) (N-2,6-$C_6H_3$-i-$Pr_2$)(OCMe($CF_3$)$_2$)$_2$, the catalyst taught by Schrock, et al., *J. Am. Chem. Soc.* 110, 1423 (1988). Ratio of reactant to catalyst was in a mole ratio of 500:1. Yields were reported as essentially quantitative.

Preparation of difunctional terminated unsaturated polymers by olefin metathesis from a polyene and a olefin containing a functional group has been reported by Wagener, et al., *Macromolecules*, 26, 2137–2138 (1993); Wagener, et al, *Polymer Preprints*, 34, 469–470 (1993), using the catalyst taught by Schrock, et al. *J. Am. Chem. Soc.*, 110, 1423 (1988).

However, the catalyst composition reported as used by Wagener has not been disclosed as commercially available and is difficult and expensive to prepare.

Olefin metathesis Lewis acid catalyst systems have been extensively reported in the prior art. Calderon, et al., U.S. Pat. No. 3,597,406, teach the polymerization of hydrocarbon substituted cyclic compounds to prepare polymers with side chains by a ring-opening polymerization of hydrocarbon substituted cyclooctadienes in the presence of a Lewis acid catalyst system comprising (A) at least one organometallic compound wherein the metal is selected from the group consisting of Ia, IIa, IIb, and IIIa of the Periodic Table of Elements, (B) at least one transition metal salt selected from the group consisting of tungsten and molybdenum halides, and (C) at least one compound of the general formula R—Y—H wherein Y is oxygen, H is hydrogen and R is a radical selected from the group consisting of (1) hydrogen (2) alkyl, (3) aryl, (4) arylalkyl, (5) alkaryl, (6) alkenyl and radicals thereof. Ofstead, U.S. Pat. No. 3,935,179, teaches a ring-opening polymerization of alicyclic hydrocarbons in the presence of a Lewis acid catalyst comprising (A) tungsten or molybdenum halides, (B) alkyl aluminum halides, and (C) an alcohol which may optionally contain a halogen constituent, and (D) an alcohol which has a nitrile substituent for ring opening polymerization of cycloolefins by cleavage of the carbon-to-carbon double bonds. The resulting polymers have repeating units derived from opening of the ring. Similar ring-opening polymerizations of cyclic olefins in presence of a Lewis acid catalyst are also taught in U.S. Pat. Nos. 3,974,092; 3,974,094; 4,010,224; 4,020,254; and 4,172,932.

Olefin metathesis Lewis acid catalyst systems for polymerizing and copolymerizing diolefins have been taught in the prior art wherein the catalyst system is comprised of a Lewis acid and a particular compound which permits carrying out the polymerization and copolymerization reactions starting with diolefins to give products of desired properties. For example, U.S. Pat. No. 4,429,089 teaches a catalytic system for polymerizing and copolymerizing diolefins comprising a Lewis acid, an aluminum compound and a particular compound belonging to the lanthanide series to give products having a high content of 1,4-cis units and high molecular weights from aliphatic conjugated diolefins such as 1,3-butadiene, 1,3-pentadiene, isoprene and their mixtures. U.S. Pat. No. 4,469,809 teaches a two-part-metathesis catalyst system wherein the first part of the catalyst system is comprised of a metathesis catalyst, preferably, $WOCl_4$, $WCl_6$, and a Lewis base to moderate the polymerization rate of a tungsten/monomer solution, the monomer preferably dicyclopentadiene. The second part of the catalyst system comprises an activator such as tetrabutyltin, triethylaluminum and similar compounds. The activator solution includes an ester ether, ketone or nitrile which serves to moderate the rate of polymerization. Similar catalyst systems are taught in U.S. Pat. Nos. 4,520,181; 4,699,963; and 4,918,039 wherein a Lewis base was used to moderate the polymerization reaction of a Lewis acid. U.S. Pat. No. 4,918,039 teaches that in the presence of a transition metal halide and a catalyst activator comprising an alkyl tin reagent, the presence of a Lewis base to stabilize the polymerization reaction can be omitted since an alkyl tin activator is a poorer Lewis acid. U.S. Pat. No. 4,977,226 teaches a ring-opening process for polymerizing a norbornene monomer in the presence of a metathesis catalyst system comprising a tungsten compound such as tungsten hexachloride in the presence of a Lewis base to prevent premature polymerization.

The monofunctional polymers and telechelic difunctional polymers prepared by the process of the instant invention are prepared by metathesis reactions which are cross-metathesis reactions between acyclic olefinic compounds or cross-metathesis reactions between cyclic and acyclic olefinic compounds. Cross-metathesis reactions have been generally classified as being of three categories: (1) exchange of atoms between two olefinic compounds to produce two different olefinic compounds, (2) ring-opening of a cyclic olefinic compound to produce acyclic polymers, and (3) degradation of olefinic polymers to produce oligomers of lower molecular weight. The reactions of the present invention are of the three categories.

With the exception of the teachings of Wagener, *Makromol. Chem.*, 191, 365–374 (1990); *Macromolecules*, 26, 2137–2138 (1993); *Polymer Preprints*, 34, 469–470 (1993), prior investigators have not dealt with the problem of preparing monofunctional or difunctional polymers by a metathesis reaction wherein the functional groups are terminal reactive groups other than vinyl groups from acyclic monofunctional olefinic compounds and which previously had been found non-reactive in a metathesis reaction. As detailed above, Lewis acid catalysts are taught in the preparation of olefinic compounds via a ring opening reaction. The effect of the presence of Lewis base upon the rate of polymerization by a Lewis acid of an olefinic compound has been recognized but there has been no teaching or inference that a metathesis catalyst system comprising a Lewis acid, an activator and a Lewis base can be used to prepare monofunctional or difunctional polymers by cross-metathesis reactions between acyclic olefinic compounds and unsaturated hydrocarbon polymers or cyclic olefinic non-conjugated compounds wherein the acyclic olefinic compounds are selected from the group consisting of alkyl acrylates and alkyl methacrylates.

K. Ichikasa, et al., *J. Org. Chem.*, 41, 2633–2635 (1976) taught use of a Lewis base catalyst as being effective for reactions of 1-alkenes using a $WCl_6$/$Bu_4Sn$ catalyst with addition of esters, acetonitrile, phenylacetylene, dicyclopentadiene and ethers to improve the selectivity to the metathesis reaction by depressing side reactions. The reactants were 1-pentene, 1-hexene, 1-heptene, 1-octene and 1-decene. The optimum range of the Sn/W mole ratio was from 2:1 to 8:1. The ratio of 1-octene to $WCl_6$ was 20–400. Products were ethylene and a symmetric internal alkene.

It is accordingly surprising and unexpected that monofunctional and telechelic difunctional polymers having at least one internal carbon-to-carbon double bond wherein the functional groups are terminal reactive groups such as an acrylate or methacrylate, the average functionality of the monofunctional product is at least 0.7, and the average functionality of the difunctional product is at least 1.7, as determined by NMR, can be prepared from acyclic monofunctional olefinic compounds in the presence of a catalyst component comprising a transition metal chloride, oxychloride, oxide, or ammonium salt, an activator comprising an organic tin compound or an aluminum halide compound and an organic Lewis base selected from the group consisting of an ester, nitrile, ether, amine, alcohol, amide, alkyne, and organic phosphorus compounds.

It is therefore an object of this invention to provide a metathesis catalytic process for preparing monofunctional and telechelic difunctional polymers from monofunctional olefinic compounds wherein the functional groups are terminal reactive groups and the average functionality of a monofunctional polymer is at least 0.7 and the average functionality of a difunctional polymer is at least 1.7, as determined by NMR. It is further an object of this invention to provide monofunctional and difunctional unsaturated polymers wherein the functional groups are reactive terminal groups other than vinyl groups and thus are positioned for further functionalization and/or incorporation into other reactive compounds. It is further an object of this invention to prepare monofunctional and telechelic difunctional polymers wherein the functional component comprises a terminal functional group, particularly an ester group such as an acrylate group or methacrylate. The reactive terminal groups can be reacted to prepare block copolymers, and other products.

It is accordingly surprising and unexpected that unsaturated acyclic functional polymers can be prepared with an olefin metathesis reaction wherein an olefinic compound reactant has been reported previously as unreactive.

It is therefore an object of this invention to prepare functional polymers from monofunctional olefinic compounds wherein the monofunctional olefinic compounds heretofore have been taught as unreactive in an olefin metathesis reaction.

SUMMARY OF THE INVENTION

This invention relates to a process for preparation of non-crosslinked linear telechelic functional unsaturated polymers of high functional purity wherein the functional groups are reactive terminal groups other than vinyl groups and are acrylate or methacrylate groups. The average terminal functionality of the monofunctional polymers is at least 0.7 and of the difunctional polymers is at least 1.7, as determined by NMR. The process in the presence of a particular catalyst system comprises the reaction of monofunctional olefinic compounds with cyclic olefinic non-conjugated compounds or unsaturated hydrocarbon polymers to prepare monofunctional and difunctional polymers. The process is substantially free of side reactions comprising double bond migration and cyclization. The catalyst comprises a composition of a transition metal chloride, oxychloride, oxide, or ammonium salt, an organic tin compound or an aluminum halide, and an organic Lewis base. This invention also relates to the non-crosslinked linear monofunctional and telechelic difunctional unsaturated polymers of high functional purity prepared by the process of this invention. The monofunctional and difunctional telechelic unsaturated functional polymers prepared by the process of this invention wherein the functional groups are terminal reactive groups can be further reacted to prepare block copolymers and other products.

DETAILED DESCRIPTION OF THE INVENTION

This invention relates to a process for preparation of non-crosslinked linear monofunctional polymers and non-crosslinked linear telechelic difunctional polymers by olefin cross-metathesis reaction and to the compositions obtained thereby. The process of this invention comprises an acyclic olefin cross-metathesis reaction wherein acyclic olefinic compounds selected from the group consisting of alkyl acrylates and alkyl methacrylates are reacted with cyclic olefinic non-conjugated compounds or unsaturated hydrocarbon polymers to prepare linear monofunctional and difunctional olefinic compound products. The reaction comprises a ring-opening cross-metathesis reaction of a cyclic olefinic non-conjugated compound or a cross-metathesis reaction with an unsaturated linear hydrocarbon polymer in the presence of a linear olefinic compound selected from the group consisting of an alkyl acrylate and an alkyl methacrylate, wherein the alkyl group contains from 1 to 12 carbon atoms. Exemplary linear olefinic compounds are methyl acrylate and methyl methacrylate. The compositions obtained thereby can be further reacted to prepare additional compounds suitable for further reactions.

Non-crosslinked linear monofunctional and telechelic difunctional polymers obtained by the process of this invention are defined as polymers consisting essentially of strictly linear hydrocarbon chains comprising repeating monomer units of 3 to 30 carbon atoms, said hydrocarbon chains without any side chains or pendant groups which would cause cross-linking. The number of monomer repeating units can be from 3 to about 10,000.

Non-crosslinked linear monofunctional polymers prepared by the process of this invention are defined as monofunctional polymers having a terminal functional reactive group selected from the group consisting of acrylate and methacrylate moieties and an average functionality number which is at least 0.7, as determined by NMR. Non-crosslinked linear difunctional telechelic polymers prepared by the process of this invention are defined as difunctional polymers containing terminal functional end-groups selected from the group consisting of acrylate and methacrylate moieties and the average functionality number is at least 1.7, as determined by NMR. The terminal functional end moieties are specifically defined as acrylate groups or methacrylate groups, other than vinyl groups. The difunctional polymers prepared by the process of this invention are further defined as having a predominant absence of non-functional terminal end-groups. The functionality numbers refer to the average number of terminal functional groups per hydrocarbon chain of the polymers prepared by the process of this invention.

Alkyl acrylates and alkyl methacrylates, such as methyl acrylate and methyl methacrylate, do not react in self-metathesis reactions to prepare dimers of alkyl acrylates and alkyl methacrylates, but do react in a cross-metathesis reaction with cyclic olefinic compounds in a ring-opening reaction and with unsaturated polymers. Alkyl acrylates and alkyl methacrylates therefore are unsuitable as self-metathesis reactants, but are suitable as cross-metathesis reactants with an unsaturated acyclic hydrocarbon polymer in the preparation of a polymer comprising a linear functional unsaturated polymer with terminal reactive moieties comprising acrylate or methacrylate moieties.

Accordingly, a linear acyclic monofunctional olefinic compound is suitably prepared wherein the functional group is either an acrylate group or a methacrylate group, e.g., from methyl acrylate or methyl methacrylate, and the other reactant is a cyclic olefinic non-conjugated compound or an acyclic unsaturated hydrocarbon polymer of number-average molecular weight of up to about 1,000,000. The reaction is in the presence of a catalyst composition comprising a transition metal chloride, oxyhalide, oxide or ammonium salt, an organic tin compound or aluminum halide reagent, and an organic Lewis base. The resulting product mixture can be further reacted with said linear acyclic monofunctional olefinic compound suitably prepared as above or with a cyclic olefinic compound or an acyclic unsaturated hydrocarbon polymer of number average molecular weight of up to about 1,000,000 to prepare a difunctional oligomer or polymer without purification of the mixture.

Surprisingly and unexpectedly, it has been found that acrylate or methacrylate-terminated functional polymers can be prepared in the presence of the above catalyst. The functional acyclic olefinic compound can serve as the Lewis base. The ratios of the three catalyst components are in the range of from about 1.0:0.1:0.1 to about 1.0:20:1000. The acyclic olefinic compound containing a functional group is also a chain terminating agent. Product molecular weight is controlled by the molar ratio of the cyclic olefinic non-conjugated compound or acyclic unsaturated hydrocarbon polymer reactant and the functional olefinic compound reactant. The molar ratios of the two reactants are in the range of from about 1:1 to 10,000:1, cyclic olefinic compound or acylic unsaturated hydrocarbon polymer repeating unit to functional acyclic olefin. A low molar ratio yields lower molecular weight products, while a higher ratio yields higher molecular weight products.

The olefin metathesis process of the instant invention for preparation of monofunctional unsaturated polymers and telechelic difunctional unsaturated polymers wherein the functional groups are reactive terminal groups wherein the average functionality of the monofunctional polymers is at least 0.7 and the average functionality of the difunctional polymers is at least 1.7, as determined by NMR, is especially suited for preparation of polymers by metathesis reaction with certain unsaturated compounds such as an alkyl acrylate and alkyl methacrylate wherein the alkyl group contains from 1 to 12 carbon atoms, example being methyl acrylate and methyl methacrylate, previously considered non-reactive in a metathesis reaction.

Accordingly, the process of the instant invention utilizes a cross-metathesis reaction between an acyclic olefinic compound and a cyclic olefinic non-conjugated compound or unsaturated hydrocarbon polymer to yield a monofunctional or difunctional polymer product. The process comprises a cross-metathesis reaction of a cyclic olefinic non-conjugated compound of up to 30 carbon atoms or an unsaturated hydrocarbon polymer with a monofunctions olefinic compound, either an alkyl methacrylate or an alkyl acrylate.

The following general reactions, wherein R is a portion of a cyclic molecule or a linear hydrocarbon chain; R' is a hydrogen or a methyl moiety and R" is an alkyl group of up to 12 carbon atoms, illustrate the process of the invention:

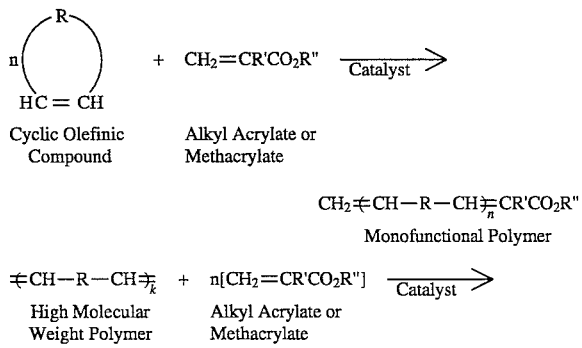

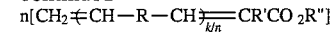
Low Molecular Weight
Monofunctional Polymer

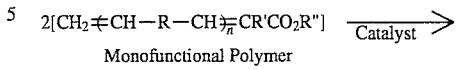
Monofunctional Polymer

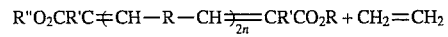
Difunctional Polymer    Ethylene
(Lower Molecular Wgt. Olefinic Compound)

wherein k is a number from 1 to about 200,000 and n is a number from 1 to about 10,000. When R' is a hydrogen moiety, the group is an acrylate group. When R' is a methyl moiety, the group is a methacrylate group.

The process of the instant invention accordingly comprises a ring-opening cross-metathesis reaction of a cyclic olefinic non-conjugated compound in the presence of a functional acyclic olefinic compound reactant or a cross-metathesis reaction of an unsaturated hydrocarbon polymer with a functional acyclic olefinic compound reactant at a temperature of from about 0° C. to about 200° C. and a pressure from about $1 \times 10^{-6}$ mm Hg to about 30 atmospheres. All reactions should be liquid phase reactions, using neat liquid reactants, solvents, or diluents.

The invented process utilizes a catalyst composition comprising (a) a transition metal chloride, oxyhalide, oxide or ammonium salt, (b) an organic tin compound or aluminum halide reagent, and (c) an organic Lewis base wherein undesired side reactions such as double bond migration are minimized.

As the transition metal catalyst component, (a), there can be mentioned halides, oxyhalides, oxides and organic ammonium salts, preferably of tungsten, ruthenium, molybdenum, rhenium and tantalum. As preferred examples, there can be mentioned tungsten compounds such as tungsten hexachloride, tungsten oxytetrachloride, tungsten oxide, tridodecylammonium tungstate, methyltricaprylammonium tungstate, tri(tridecyl)ammonium tungstate and trioctylammonium tungstate, molybdenum compounds such as molybdenum pentachloride, molybdenum oxytrichloride, tridecylammonium molybdate, methyltricaprylammonium molybdate, tri(tridecyl)ammonium molybdate and trioctylammonium molydate, rhenium compounds such as rhenium pentachloride, rhenium oxide, rhenium oxide supported on an oxide such as alumina, silica, or silica-alumina, rhenium oxide together with a promoter such as boron oxide on an oxide support, and tantalum compounds such as tantalum pentachloride.

Organic tin compounds, alkylaluminum halides, alkoxyalkylaluminum halides and aryloxy-alkylaluminum halides can be used as the activator (b). As preferred examples, there can be mentioned tetrabutyltin, tetramethyltin, tetraethyltin, tetraphenyltin, ethylaluminum dichloride, diethylaluminum monochloride, ethylaluminum sesquichloride, diethylaluminum iodide, ethylaluminum diiodide, propylaluminum dichloride, propylaluminum diiodide, isobutylaluminum dichloride, ethylaluminum dibromide, methylaluminum sesquichloride, methylaluminum sesquibromide, and precondensates of alkylaluminum halides with alcohols.

The Lewis base (c) useful in this invention includes linear functional olefinic compounds having at least one functional terminal reactive group as a reactant in reaction (A), ethers, esters, nitriles, ketones, amides, amines, phosphorus compounds and alcohols of up to 30 carbon atoms, and other organic Lewis bases which are soluble or can be suspended in the reaction mixture or solvent. Examples are alkyl and aryl acetates, alkyl acrylates, alkyl methacrylates, alkyl undecylenates, acetonitrile, benzonitrile, acrylonitrile, acetylacetone, tetrahydrofuran, pyridine, N,N'-dimethylformamide, thiophene, ethyl ether, propyl ethers, diphenyl ether, triethylamine, phenylacetylene, organic phosphorus compounds of from 1 to 30 carbon atoms and monohydric and dihydric alcohols of from 1 to 30 carbon atoms such as methyl alcohol, ethyl alcohol, n-propyl alcohol, isopropyl alcohol, n-butyl alcohol, isobutyl alcohol, tert-butyl alcohol, n-pentyl alcohol, isopentyl alcohol, 2-methyl-1-butyl alcohol, 2-methyl-2-butyl alcohol, n-hexyl alcohol, n-heptyl alcohol, n-octyl alcohol, isooctyl alcohol, 2-ethylhexyl alcohol, n-nonyl alcohol, n-decyl alcohol, 1,5-aentanediol, 1,6-hexanediol, allyl alcohol, crotyl alcohol, 3-hexene-1-ol, citronellol, cyclopentanol, cyclohexanol, salicyl alcohol, benzyl alcohol, phenethyl alcohol, cinnamyl alcohol, and the like. The Lewis base (c) is preferably an ester, such as an alkyl acetate, instead of an alcohol. A nitrile such as acetonitrile is preferable to pyridine.

Any alkyl acrylate or alkyl methacrylate wherein the alkyl group comprises from 1 to 12 carbon atoms is suitable for the process of this invention. Representative examples are methyl, ethyl, propyl to dodecyl acrylate, and methyl, ethyl, propyl to dodecyl methacrylate.

In general, any cyclic olefinic non-conjugated compound of from 4 to about 30 carbon atoms can be polymerized in the process of this invention. The cyclic olefins include both mono- and polycyclic unsaturated hydrocarbon compounds. Representative examples of suitable polycyclic unsaturated hydrocarbon compounds include norbornene, norbornadiene, 2,2,2-bicyclooctene-2, dicylopentadiene and the like.

The preferred unsaturated alicyclic compounds of this invention are those comprising a single unsaturated alicyclic ring. These alicyclic rings may be mono- or multi-substituted by such groups as alkyl, aryl, arylalkyl, and halogen groups and contain at least one non-conjugated carbon-to-carbon double bond.

Representative examples of unsaturated alicyclic non-conjugated compounds containing a single alicyclic ring having at least 4 and not more than 5 carbon atoms in the cyclic ring and containing one double bond in said ring are cyclobutene and cyclopentene. Representative examples of unsaturated alicyclic compounds containing at least seven carbon atoms in the cyclic ring and containing one or more non-conjugated carbon-to-carbon double bonds in the cyclic ring include cyclooctene; 1,4- and 1,5-cyclooctadiene; 1,4,7-cyclononatriene, cyclodecene, cyclododecene, 1,4-, 1,5- and 1,6-cyclodecadiene: 1,4-, 1,5-, 1,6- and 1,7-cyclododecadiene; 1,4,7- and 1,5,9-cyclododecatriene and the like.

Preferred unsaturated alicyclic compounds of this invention are those containing from one to three carbon-to-carbon double bonds in the ring and in which the double bonds are located in relation to each other in a manner that they are not adjacent and are non-conjugated. Representative examples of preferred materials are cyclobutene, cyclopentene, cyclooctene, cyclododecene, and 1,5-cyclooctadiene, 1,5,9-cyclododecatriene and 1,9,17-cyclotetracosatriene.

Representative examples of substituted unsaturated alicyclic non-conjugated compounds are alkyl-substituted compounds such as 1-methyl-1,5-cyclooctadiene; aryl-substituted compounds such as 3-phenyl-1-cyclooctene; aralkyl-substituted compounds such as 3-benzyl-1-cyclooctene; alkaryl-substituted compounds such as 3-tolyl-1-cyclooctene and halogen-substituted compounds such as a 5-chloro-1-cyclooctene, 1-chloro-1,5-cyclooctadiene; 5-chloro-1-cyclododecene and 5,6-dichloro-1-cyclooctene. Mixtures of the unsaturated alicyclic compounds may be polymerized, including both substituted unsaturated alicyclic non-conjugated compounds and the unsubstituted unsaturated alicyclic non-conjugated compounds.

The unsaturated hydrocarbon polymer useful as a reactant can be a low molecular weight oligomer of up to four monomer units or a high molecular weight polybutadiene, polyisoprene, butyl rubber, and the like, of number average molecular weight of up to 1,000,000 and mixtures thereof.

The metathesis catalyst comprising (a), the transition metal compound, is used in an amount of about 0.01 to about 50 millimoles, preferably 0.1 to 10 millimoles, per mole of the carbon-to-carbon double bond units present in the olefinic compound reactants. The activator (b) is used at a molar ratio of from 0.001 to 200:1, preferably from about 0.1 to about 10, per mole of the catalyst component (a). The organic Lewis base is used at a molar ratio of from about 0.1:1 to about 10,000:1 moles, preferably from about 1:1 to about 100:1 per mole of the catalyst component (a).

Preferably both the metathesis catalyst and the activator are used when dissolved or suspended in the reactants, but the catalyst and activator can be used when suspended or dissolved in a small amount of a solvent, as long as the properties of the product are not substantially degraded. Preferred solvents are benzene, toluene, xylene, pentane, hexane, heptane, cyclohexane, methylcyclohexane, chlorobenzene, dichlorobenzene, and mixtures thereof.

Any reagent for deactivating the activator or the metathesis catalyst system, for example, an alkylaluminum chloride, or the catalyst component of the metathesis catalyst system, for example, a tungsten compound catalyst or a molybdenum compound catalyst, can be used as the stopper for the polymerization reaction. As preferred examples, there can be mentioned alcohols such as methanol, ethanol, n-propyl alcohol and n-butanol, amines such as ammonia, organic acids such as acetic acid and propionic acid, and oxygen, carbon dioxide, and water.

If an appropriate amount of an alcohol is used as the stopper for the reaction, only the activator such as an aluminum compound is deactivated but the catalyst component such as a molybdenum catalyst is left in the liquid product in a reusable state. Of course, a stopper capable of deactivating both of the activator and the catalyst component can be used. In the polymerization reaction, the metathesis catalyst component is used in an amount of 0.01 to 50 millimoles, preferably 0.1 to 10 millimoles, per mole of the monomers as a whole. The activator (is used at a molar ratio of from 0.01 to 200, preferably from 1 to 10, to the catalyst component. It is sufficient if the stopper for the polymerization reaction is used in an amount enough to deactivate the catalyst system. The amount differs according to the kind of the activator or the catalyst component, but the amount can be easily determined by preliminary experiments. For example, where a dialkylaluminum halide is used as the activator and an alcohol is used as the stopper for the viscosity-increasing reaction, it is sufficient if the alcohol is used in an amount of at least 2 moles per mole of the activator.

The metathesis polymerization is preferably performed in liquid phase, with catalyst components dissolved or suspended in a solvent or liquid olefinic compound reactant. Reaction temperatures are preferably from about 0° C. to 200° C. Pressure can be in the range of from about $1 \times 10^{-6}$ mm Hg to about 30 atmospheres, preferably from about $1 \times 10^{-6}$ mm Hg to about 1 atmosphere. Any lower molecular weight olefinic compound coproduct, i.e., of lower molecular weight than the starting olefinic compound reactants, should be removed efficiently to drive the reaction to high conversion.

In the practice of this invention, the catalyst composition preferably comprises a tungsten metal chloride, a tetraalkyltin reagent and an organic Lewis base selected from the group consisting of the functional olefin reactant, an alkyl acetate, a nitrile, and an ether. Inasmuch as the tungsten catalyst in the presence of an activator such as a tetraalkyltin compound, in the absence of a Lewis base, can catalyze side reactions in a metathesis reaction of an olefinic compound, a sequence of mixing the components of the catalyst system is preferred.

The tungsten compound is preferably suspended or dissolved in a small amount of a suitable solvent, preferably in an olefinic compound monomer if the tungsten compound is soluble in the monomer. An alcoholic or phenolic compound is also suitable, phenolic compounds being preferred over an alcoholic compound. Suitable phenolic compounds include phenol, alkyl phenols, and halogenated phenols, with tert-butyl phenol, tert-octyl phenol and nonyl phenol most preferred. The preferred molar ratio of the tungsten compound/phenolic compound is from about 1:1 to about 1:3. The tungsten compound/phenolic compound solution can be prepared by adding the phenolic compound to the tungsten compound, stirring the solution and then blowing a stream of a dry inert gas through the solution to remove any hydrogen chloride.

The addition of the Lewis base can be in an amount of from about 0.1 to about 10,000 moles of Lewis base per mole of tungsten compound. Preferred Lewis bases include nitriles, ethers and esters such as alkyl acetates, benzonitrile, acetonitrile, tetrahydrofuran.

In some metathesis reactions, one of the products of the metathesis reaction is an olefinic compound of a lower molecular weight than the starting acyclic olefinic compound reactant. In the instant process, it has been found that removal of the co-product olefinic compound of the lower molecular weight, i.e., ethylene, than the starting acyclic olefinic compound reactant is essential to obtain high reaction conversion. This may be accomplished by suitable means such as purging the reaction vessel with inert gas, by applying a low or high vacuum to the system, or by any combination of these methods during the reaction, including the omission of one or more of these procedures, the said steps being in any sequence and capable of being omitted individually. The inert gas can comprise nitrogen, the low vacuum from about 1 mm Hg to about 400 mm Hg, and the high vacuum to about $1 \times 10^{-6}$ mm Hg.

Color bodies comprising catalyst residue, measured as the presence of tungsten in parts per million (ppm) can impart a color which may be unacceptable to polymers prepared by the process of the metathesis reactions using a catalyst comprising a tungsten metal chloride, a tetraalkyltin reagent and an organic Lewis base. Despite treatment and filtration of the polymer product with paper and fiber glass filtration procedures or treatment with diatomaceous earth to remove particulate matter, the filtered and treated polymer product can retain an unacceptable color which is typically a yellow to a dark orange yellow variable color of amber hue. It has been found that reduction of the presence of tungsten to less than 100 ppm, as measured by inductively coupled plasma spectroscopy (ICP), results in a polymer free of a predominant color. This may be accomplished by suitable means such as treatment of the color-containing polymer in a suitable solvent with activated charcoal. The treatment with activated charcoal can be at room temperature and can be for an extended period. Any solvent which can dissolve the polymer and which can be removed easily by evaporation can be suitable.

Graff copolymers can be prepared by reacting linear non-crosslinked mono functional unsaturated polymers with a reactive terminal group wherein the terminal group is an ester moiety selected from the group consisting of acrylate and methacrylate moieties with excess vinyl or acrylic monomer to prepare a macromolecule copolymer with a graff-type architecture. Similarly, a block copolymer can be prepared by reacting linear non-crosslinked difunctional unsaturated polymers with reactive terminal groups in a block-type architecture wherein the terminal groups are ester moieties with excess unsaturated monomer such as styrene, isoprene, and butadiene.

Accordingly, the instant invention comprises an olefin cross-metathesis process for preparing non-crosslinked linear monofunctional and telechelic difunctional polymers and to the polymers obtained thereby wherein the chain terminal groups are functional reactive groups such as acrylates or methacrylates, wherein said process comprises an olefin cross-metathesis reaction of alkyl acrylates or alkyl methacrylates with an olefinic compound selected from the group consisting of a cyclic olefinic non-conjugated compound of from about 4 to 30 carbon atoms and a linear unsaturated hydrocarbon polymer in the presence of a catalyst composition comprising (a) a transition metal compound selected from the group consisting of halides, oxyhalides, oxides and organic ammonium salts, preferably of tungsten, ruthenium, molybdenum, rhenium or tantalum; an activator (b) selected from the group consisting of organic tin compounds, alkylaluminum halides, alkoxyalkylaluminum halides and aryloxy-alkylaluminum halides; and an organic Lewis base (c) selected from the group consisting of esters, ethers and nitriles of up to 30 carbon atoms, and other organic Lewis bases, preferably comprising alkyl acetates, acetonitrile, acetylacetone, tetrahydrofuran, pyridine, N,N'-dimethylformamide, thiophene, diphenylether, triethylamine, and organic phosphorus compounds, wherein said catalyst (a) is present in an amount of from about 0.01 to about 50 millimoles transition metal compound per mole of carbon-to-carbon double bond units present in the said olefinic compound reactants, activator (b) is present in a molar ratio to metathesis catalyst (a) of from about 0.001:1 to about 200:1, and organic Lewis base (c) is present in a molar ratio to metathesis catalyst (a) of from about 0.1:1 to about 10,000:1.

The following examples are exemplary only and are not to be construed as limiting the scope of this invention.

EXAMPLE 1

The following illustrates the preparation of a functional polymer from a cyclic olefin, 1,5-cyclooctadiene, and methyl methacrylate.

A 200-cc Fisher-Porter bottle was charged with the following in this order under nitrogen atmosphere: 35 mL chlorobenzene, 15.0 mL 1,5-cyclooctadiene (122 mmol), 3.75 mL methyl methacrylate (35 mmol), 0.56 mL propyl acetate (4.9 mmol), 0.48 g tungsten hexachloride (1.2 mmol, Aldrich Chemical Co. Milwaukee, Wis., 99.9%), and 0.34 mL tetramethyltin (2.4 mmol). The mixture was magnetically stirred at room temperature for several minutes, then heated to 80° C. The solution was stirred at 80° C. for 24 hours. GC analysis indicated complete (>99%) conversion of the 1,5-cyclooctadiene and approximately 20% conversion of the methyl methacrylate at this point. The reaction was terminated by addition of 50 mL 1N sodium hydroxide solution and vigorously stirred for about 5 hours at 80° C. The organic layer was then separated from the aqueous phase, washed with water, dried with magnesium sulfate, and stripped of solvent and remaining methyl methacrylate by rotary evaporation. A pale yellow, moderately viscous liquid product was obtained (10 grams, labelled Sample No. 15685-106-1). Nuclear magnetic resonance analysis (NMR) showed no remaining solvent or methyl methacrylate.

Molecular weight of the product was determined by gel permeation chromotography (GPC). Number-average molecular weight (Mn=1290), weight-average molecular weight (Mw=2921), and the vapor pressure osmometry (VPO) (Mn=1162) indicated the product to be polymeric. Infrared (IR) analysis of the product showed a strong carbonyl absorption at ~1725 wavenumbers, attributed to ester (methacrylic) endgroups, a moderate intensity C=C double bond absorption at 1640–1670, and a moderate intensity band at 910 attributed to vinyl endgroups.

A quantitative C-13 NMR analysis was performed of the product dissolved in chloroform-d with chromium acetylacetonate added as a relaxation agent. The spectrum was similar to that of 1,4-polybutadiene with the addition of weak resonances associated with vinyl and methyl methacrylic endgroups. Strong resonances were observed in the 128–132 ppm range, assigned as internal olefinic carbons of the oligomer backbone: $(-CH_2-CH=CH-CH_2-)_n$. Strong singlet resonances were observed at 33 ppm and 27.5 ppm in an approximate ratio of 2:1, assigned to methylene carbons adjacent to trans and cis internal backbone C=C double bonds, respectively. The relative integration of the backbone internal olefinic carbon and methylene carbon was about 1:1, as expected for 1,4-polybutadiene.

The NMR spectrum was consistent with two types of polymer endgroups: —CH=CH2 (vinyl) and —CH=C(CH$_3$)CO$_2$CH$_3$ (methyl methacrylic). Weak singlet resonances of approximately equal intensity were observed at 168.2 ppm (carbonyl carbon of methyl methacrylic endgroup), 141.6 and 127.6 ppm (olefinic carbons of methyl methacrylic endgroup), 138.2 and 114.5 ppm (vinyl endgroup carbons), 51.5 ppm (methoxy carbon of methyl methacrylic) and 12.4 ppm (allylic methyl of methyl methacrylic). (A NMR spectrum of a similar sample, 15685-172-1, indicated the 141.6 ppm resonance to be a CH, assigned as the CH olefinic carbon of the methyl methacrylic endgroup, and the 127.6 ppm peak to be a carbon with no attached hydrogens, assigned as the other methacrylic olefinic carbon). The integration of each of these endgroup resonances was about 1.5% of the total integration of internal backbond olefinic carbon (128–132 ppm). No other endgroup types were discernible, and no other resonances were detected between 0 and 25 ppm, indicating a lack of any other methyl carbons besides that of the methyl methacrylic endgroup.

In summary, the spectroscopic and molecular weight data are consistent with a polymeric product having a 1,4-polybutadiene structure with methyl methacrylic and vinyl endgroups.

EXAMPLE 2

The following illustrates the preparation of a functional polymer from a cyclic olefin, 1,5-cyclooctadiene, and methyl acrylate.

The same procedure was performed as in Example 1 except that methyl acrylate (3.15 mL, 35 mmol) was employed instead of methyl methacrylate. GC analysis after 24 hours at 80° C. indicated 30% conversion of 1,5-cyclooctadiene and 19% conversion of methyl acrylate. Work-up (including rotary evaporation of solvent and remaining olefin reactants) yielded 3.3 g of a very pale yellow, clear, oily liquid (Sample No. 15685-142-2). IR analysis of the product showed a strong carbonyl absorption at ~1735 wavenumbers, attributed to ester (acrylic) endgroups, a moderate intensity C=C double bond absorption at 1640–1670, and a moderate intensity band at 910 attributed to vinyl endgroups.

Quantitative C-13 NMR analysis showed features similar to the product in Example 1, with methyl acrylic endgroup resonances instead of methyl methacrylic. The 1,4-polybutadiene backbone structure was observed, with a 0.3 trans/cis C=C double bond ratio (backbone internal double bonds). The relative integration of the backbone internal olefinic carbon and methylene carbon was about 1:1, as expected for 1,4-polybutadiene.

The NMR spectrum was consistent with two types of polymer endgroups: —CH=CH$_2$ (vinyl) and —CH=CH—CO$_2$CH$_3$ (methyl acrylic). Weak singlet resonances of similar intensity were observed at 166.7 ppm (carbonyl carbon of methyl acrylic endgroup), 148.6 and 121.1 ppm (olefinic carbons of methyl acrylic endgroup), 148.6 and 121.1 ppm (olefinic carbons of methyl acrylic endgroup), 138.2 and 114.5 ppm (vinyl endgroup carbons), and 51.3 ppm (methoxy carbon of methyl acrylic). The integration of each of the methyl acrylic endgroup resonances was about 0.9% of the total integration of internal backbone olefinic carbon (128–132 ppm), while the integration of each of the two vinyl endgroup resonances was about 1.25%. No other endgroup types were discernible, and no resonances were detected between 0 and 25 ppm, indicating a lack of methyl carbons other than the methoxy.

In summary, the spectroscopic and molecular weight data are consistent with a polymeric product having a 1,4-polybutadiene structure with methyl acrylic and vinyl endgroups.

EXAMPLE 3

The following illustrates the preparation of a telechelic difunctional polymer from a cyclic olefin, 1,5-cyclooctadiene, and methyl methacrylate.

1,2-Dichlorobenzene solvent (Aldrich Chemical Co., Milwaukee, Wis., HPLC grade) was purified by passage through a column of silica gel and 13X sieves, and stored over 4A sieves. Hexyl acetate and tetramethyltin were dried over 4A sieves. 1,5-Cyclooctadiene (Aldrich, 99+%) was stored over 4A sieves. Methyl methacrylate (Aldrich) was used as obtained without removal of inhibitor. Tungsten hexachloride (99.9%) was obtained from Aldrich, used as obtained, and stored under nitrogen.

The reaction vessel consisted of a 250-mL three-neck round-bottom glass flask (with magnetic stirbar) fitted with a water-cooled reflux condenser (on the center neck) and stopcock adapters (on outer necks). Prior to introduction of reagents, the apparatus was purged with a rapid flow of nitrogen (inlet at a flask neck and outlet through the condenser). The three-neck round-bottom flask was immersed in a constant-temperature oil bath for heating.

The following were added to a round-bottom flask under nitrogen at room temperature: 1,2-dichlorobenzene (35 mL), methyl methacrylate (13.0 mL, 122 mmol), 1,5-cyclooctadiene (15.0 mL, 122 mmol), hexyl acetate (1.60 mL, 9.7 mmol), tungsten hexachloride (0.97 g, 2.44 mmol), and tetramethyltin (0.68 mL, 4.9 mmol). The solution was stirred well to fully dissolve the tungsten hexachloride, and was then cannula-transferred to the above-described reaction vessel under nitrogen. The reaction vessel was heated to 80 deg C. The solution was stirred at 80 deg C. for 5 hours under static nitrogen atmosphere. (After the 5 hours, cyclooctadiene conversion was estimated to be essentially complete and methyl methacrylate conversion was estimated at 10–15%, by FID GC analysis). After 5 hours, a 1.5-SCFH nitrogen flow through the apparatus was initiated and maintained for the duration of the experiment.

The experiment was continued for a total of 4 days (approximately 96 hrs) at 80 deg C. After approximately 24 hours, GC analysis of the reaction solution indicated no remaining cyclooctadiene or methyl methacrylate. (Most of the methyl methacrylate loss was due to evaporation caused by the high nitrogen flow rate). IR analysis of a sample of the oligomer product at this point showed a strong ester endgroup band (C=O, 1725 wave numbers), but also a moderate-intensity vinyl endgroup band (910 wave numbers) indicating incomplete metathesis of the vinyl endgroups. An addition of fresh catalyst solution (1.60 mL hexyl acetate, 0.97 g tungsten hexachloride, and 0.68 mL tetramethyltin dissolved in 35 mL 1,2-dichlorobenzene) was made to the reaction vessel. IR analyses and additions of fresh catalyst solution were also performed after approximately 48 hours and approximately 72 hours. At the conclusion of the run (approximately 96 hours), IR analysis showed only a very weak vinyl endgroup band remaining in the oligomer product, with a strong carbonyl band (1725 wave numbers).

The reaction solution was cooled to room temperature, and quenched by bubbling dry ammonia gas through the solution for 40 minutes. The black precipitate which was produced by the ammonia treatment was removed by filtration. Solvent was removed from the filtrate by rotary evaporation at 95 deg. C., leaving 10.3 g of a viscous, yellow-orange, cloudy polymer product (Sample No. 15685-17201). Quantitative C-13 NMR was performed using chloroform-d as solvent with chromium acetylacetonate added as a relaxation agent.

The C-13 NMR spectral data for this product are given in Table I. The spectrum indicates a 1,4-polybutadiene backbone structure for the polymer, with methyl methacrylic and vinylic endgroups. There was no clear evidence in the NMR analysis for other endgroup types. Assuming acyclic and non-branched chains, the ester (methyl methacrylic endgroup) functionality was estimated at Fn=1.7 (85% ester endgroups, 15% vinyl endgroups). The trans/cis ratio of C—C bonds in the 1,4-polybutadiene backbone was about 3:1. Mn was estimated at 1200–1600. No poly(methyl methacrylate) was detected in the NMR. However, a broad underlying resonance of significant area was seen in the sp3 carbon region (10–54 ppm), assigned as "detrital carbon" $CH_2$ and CH species. Since the specific character of this "detrital" material is not clear, the functionality number (Fn) calculated above is only an approximation.

TABLE 1

| Chemical Shift ppm,d) | Relative Integration | Assignment |
| --- | --- | --- |
| 128–132 (m) | 350 | Internal Olefinic carbons (backbone) |
| 168.4 (s) | 17.7 | C=O of methyl methacrylic endgroup |
| 141.9 (s) | 15.7 | =CHR of methyl methacrylic |

TABLE 1-continued

| Chemical Shift ppm,d) | Relative Integration | Assignment |
| --- | --- | --- |
|  |  | endgroup |
| 127.9 (s) | 16.3 | =CRMe of methyl methacrylic endgroup |
| 51.7 (s) | 18.4 | $OCH_3$ of methyl methacrylic endgroup |
| 12.6 (s) | 17.2 | allylic —$CH_3$ of methacrylic endgroup |
| 138.2 (s) | 2.6 | =CHR of vinylic endgroup |
| 114.5 (s) | 2.6 | =$CH_2$ of vinylic endgroup |
| 32.9 (s) | 222 | $CH_2$ adjacent to trans —C=C— (backbone) |
| 27.6 (s) | 60 | $CH_2$ adjacent to cis —C=C— (backbone) |
| 27–33**a | 110 | Other $CH_2$ resonances |
| 10–54 br)**b | 154 | Detrital sp3 C |

**a A number of small singlet resonances, some overlapping, assigned as $CH_2$s; primarily $CH_2$s alpha and beta to endgroups.
**b Very broad, underlying resonance, primarily sp3 $CH_2$ and sp3 CH with little $CH_3$.

EXAMPLE 4

The following illustrates the preparation of ester-functionalized oligomers and polymers by cross-metathesis reaction of an unsaturated polymer, 1,4-polybutadiene, with methyl methacrylate. The ester-functionalized oligomers prepared are of lower molecular weight.

Reagents: A high molecular weight cis-1,4-polybutadiene (Goodyear, Budene 1208, date code BC180891, 98% cis-1, 4, Mn 85,000–95,000, Mw 400,000–420,000) was employed in neat, uncured form. 1,2-Dichlorobenzene, Aldrich HPLC grade, was purified by passage through a column of silica gel and 13X sieves, and stored over 4A sieves. Propyl acetate and tetramethyltin were dried over 4A sieves. Methyl methacrylate (Aldrich, 99%) was used as obtained without removal of inhibitor. Tungsten hexachloride (Aldrich, 99.9+%) was used as obtained.

A 200-cc Fisher-Porter bottle was charged with the following in this order under nitrogen atmosphere: 4.5 g polybutadiene (83 mmol $CH_2CH=CHCH_2$—repeat unit), 140 mL 1,2-dichlorobenzene, 2.2 mL methyl methacrylate (21 mmol), 0.38 mL propyl acetate (3.3 mmol), 0.33 g tungsten hexachloride (0.83 mmol), and 0.23 mL tetramethyltin (1.7 mmol). The mixture was magnetically stirred at room temperature for several minutes, then heated to 80 deg C. It was noted that the polybutadiene was not entirely dissolved after 3–4 hours at 80 deg C. The solution was stirred at 80 deg C. for a total of 20.5 hours, at which point there was no evidence of undissolved polymer. The solution was cooled to room temperature and the reaction terminated by bubbling dry gaseous ammonia through the solution for 10 minutes. The solution was filtered to remove catalyst residue. Volatile liquids (dichlorobenzene, propyl acetate, and unreacted methyl methacrylate) were removed from the filtered solution by rotary evaporation, leaving a viscous brown liquid product (4.5 g).

The low molecular weight of this product was determined by GPC (Mn=410, Mw=1170). IR analysis of the product showed a carbonyl band at 1717.5 wavenumbers, attributed to ester (methacrylic) endgroups, a weak intensity C=C band at 1640–1670 wavenumbers, and a weak band at 910 wavenumbers attributed to vinyl endgroups.

A quantitative C-13 NMR was performed of the product dissolved in chloroform-d with chromium acetylacetonate added as a relaxation agent. Strong resonances were observed in the 128–132 ppm range, assigned as internal olefinic carbons of the 1,4-polybutadiene backbone: ($-CH_2CH=CH-CH_2-)_n$. Strong singlet resonances were observed at 32.5 ppm and 27.2 ppm in an approximate ratio of 1:1. assigned to methylene carbons adjacent to trans and cis internal backbone C=C double bonds, respectively. The relative integration of the backbone internal olefinic carbon and methylene carbon was about 1:1, as expected from 1,4-polybutadiene. The spectrum was consistent with two types of endgroups: $-CH=CH_2$ (vinyl) and $-CH=C(CH_3)CO_2CH_3$ (methyl methacrylic). Weak singlet resonances were observed at 168.1 ppm (carbonyl carbon of methyl methacrylic endgroup), 141.5 ppm (an olefinic carbon of methyl methacrylic endgroup), 138.1 and 114.4 ppm (vinyl endgroup carbons), 51.4 ppm (methoxy carbon of methyl methacrylic) and 12.3 ppm (allylic methyl of methyl methacrylic). The integration of each of the endgroup resonances was in the range of 1–2% of the total integration of internal backbond olefinic carbon (128–132 ppm). Integrated intensities of the vinyl carbon resonances were roughly double those of the methyl methacrylic resonances.

The spectroscopic and molecular weight data indicate the product to consist of low molecular weight 1,4-polybutadiene oligomers with methyl methacrylic and vinyl endgroups. This is the product of metathesis depolymerization.

That which is claimed is:

1. A process for the preparation of linear monofunctional and telechelic difunctional unsaturated polymers having at least one internal carbon-to-carbon double bond and containing terminal functional reactive groups other than vinyl groups, from olefinic compound reactants in a process comprising a cross-metathesis reaction of an olefinic compound selected from the group consisting of a cyclic olefinic non-conjugated compound of from about 4 to 30 carbon atoms and a linear hydrocarbon unsaturated polymer with an acyclic olefinic compound selected from the group consisting of an alkyl acrylate and an alkyl methacrylate, wherein the alkyl group contains from 1 to 12 carbon atoms, to prepare a linear functional unsaturated polymer wherein said reaction is a cross-metathesis reaction in the presence of a catalyst composition comprising a metathesis catalyst (a) comprising a transition metal compound selected from the group consisting of transition metal halides, oxyhalides, oxides and organic ammonium salts; an activator (b) selected from the group consisting of organic tin compounds, alkylaluminum halides, alkoxyalkylaluminum halides and aryloxyalkylaluminum halides, and an organic Lewis base (c), said metathesis catalyst (a) is present in an amount of from about 0.01 to about 50 millimoles per mole of carbon-to-carbon double bond units present in said olefinic compound reactants, activator (b) is present in a molar ratio to metathesis catalyst (a) of from about 0.001:1 to about 200:1, and organic Lewis base (c) is present in a molar ratio to metathesis catalyst (a) of from about 0.1:1 to about 10,000:1, said cross-metathesis reaction conducted at a temperature of from about 0° C. to about 200° C. and a pressure of from about $1\times10^{-6}$ mm Hg to about 30 atmospheres.

2. The process of claim 1 wherein metal of said transition metal compound of said methathesis catalyst (a) is selected from the group consisting of tungsten, molybdenum, rhenium, tantalum, and ruthenium.

3. The process of claim 1 wherein said organic Lewis base (c) is selected from the group consisting of acyclic olefinic compound reactants of said cross-metathesis reaction and esters, ethers, nitriles of up to 30 carbon atoms, acetylacetone, pyridine, N,N-dimethylformamide, thiophene, triethylamine, phenyl acetylene, organic phosphorus compounds of from 1 to 30 carbon atoms, and monohydric and dihydric alcohols of from 1 to 30 carbon atoms.

4. The process of claim 1 wherein said linear hydrocarbon unsaturated polymer comprises an unsaturated polymer of number average molecular weight of up to 1,000,000 selected from the group consisting of low molecular weight oligomers of up to four monomer units and high molecular weight polymers selected from the group consisting of polybutadiene, polyisoprene, butyl rubber and mixtures thereof.

5. The process of claim 1 wherein said process comprises a ring-opening cross-metathesis polymerization reaction of a cyclic olefinic non-conjugated compound with an acyclic olefinic compound reactant selected from the group consisting of an alkyl acrylate and an alkyl methacrylate wherein the alkyl group contains from 1 to 12 carbon atoms.

6. The process of claim 1 wherein said cyclic olefinic non-conjugated compound is selected from the group consisting of cycloheptene; 1,4-cyclooctadiene; 1,5-cyclooctadiene, norbornene, norbornadiene, 2,2,2-bicyclooctene-2; cyclooctene; cyclodecene; metheyl cyclooctadienes; dimethyl cyclooctadienes; methyl cyclooctenes; dimethyl cyclooctenes; 1,4,7-cyclononatriene; 1,4-cyclodecadiene; 1,5-cyclododecadiene; 1,6-cyclocododecadiene; 1,7-cyclododecadiene; 1,4,7-cyclododecatriene; 1,5,9-cyclododecatriene; trimethyl 1,5,9-cyclododecatriene; cyclopentene; cyclododecene; cyclobutene; 1,9,17-cyclotetracosatriene; 1-methyl-1,5-cycloctadiene; 3-phenyl-1-cyclooctene; 3-benzyl-1-cyclooctene; 3-tolyl-1-cyclooctene; 5-chloro-1-cyclooctene; 1-chloro-1,5-cyclooctadiene; 5-chloro-1-cyclodecene; 5,5-dichloro-1-cyclooctene; and mixtures thereof.

7. The process of claim 1 wherein said acyclic olefinic compound is selected from the group consisting of methyl acrylate and methyl methacrylate, and said cyclic olefinic non-conjugated compound comprises 1,5-cyclooctadiene.

8. The process of claim 1 wherein said metathesis catalyst (a) comprises tungsten hexachloride, activator (b) comprises tetramethyltin, and Lewis base (c) comprises propyl acetate.

9. The process of claim 1 wherein said metathesis catalyst (a) is present in a ratio of from about 0.1 to 10 millimoles per mole of carbon-to-carbon double bond units present in said olefinic compound reactants and said activator (b) and said Lewis base (c) are each present in a ratio to said metathesis catalyst (a) of from about 1:1 to about 10:1.

10. The process of claim 1 wherein said cross metathesis reaction is driven to high conversion by removal of the co-product olefinic compound of lower molecular weight than the acyclic olefinic compound reactant, produced by said olefin metathesis reaction of said acyclic olefinic compound reactant, wherein said co-product olefinic compound of lower molecular weight than the olefinic compound reactants is removed from said process by a combination of steps comprising a purge of the olefin metathesis reaction with an inert gas, application of a low vacuum in the range of from about 1 mm Hg to about 400 mm Hg during said reaction, and an application of a high vacuum to about $1\times10^{-6}$ mm Hg, said steps being in any sequence and capable of being omitted individually.

11. The process of claim 3, wherein said esters are selected from alkyl and aryl acetates, alkyl acrylates, alkyl methacrylates and alkyl undeceylenates; and ethers are selected from ethyl ether, propyl ethers, diphenyl ether and tetrahydrofuran; and said nitriles are selected from acetonitrile, benzonitrile and acrylonitrile.

12. The linear monofunctional and telechelic difunctional unsaturated polymers prepared by the process of claim 1, said unsaturated polymers having at least one internal carbon-to-carbon double bond and containing terminal functional reactive groups other than vinyl groups, said polymers containing less than 100 parts per million of tungsten, said polymers being free of a predominant color.

13. The linear monofunctional unsaturated polymer prepared by the process of claim 1 having at least one internal carbon-to-carbon double bond and a terminal functional reactive group other than a vinyl group, said linear monofunctional unsaturated polymer having an average functionality number of at least 0.7, as determined by nuclear magnetic resonance spectroscopy, said terminal functional reactive group is an ester moiety selected from the group consisting of an acrylate moiety and a methacrylate moiety, wherein said linear monofunctional unsaturated polymer has a number average molecular weight of up to 1,000,000.

14. The linear telechelic difunctional unsaturated polymer prepared by the process of claim 1 comprising a linear telechelic difunctional polymer having at least one internal carbon-to-carbon double bond and containing terminal functional reactive groups other than vinyl groups, said linear telechelic difunctional unsaturated polymer having an average functionality number of at least 1.7, as determined by nuclear magnetic resonance spectroscopy, said reactive functionality selected from the group of moieties consisting of acrylate moieties and methacrylate moieties, wherein said linear telechelic difunctional unsaturated polymer has a number average molecular weight of up to 1,000,000.

* * * * *

UNITED STATES PATENT AND TRADEMARK OFFICE
CERTIFICATE OF CORRECTION

Page 1 of 2

PATENT NO.: 5,621,047

DATED: April 15, 1997

INVENTOR(S): Philip O. Nubel, Howard B. Yokelson, Steven A. Cohen, William G. Bouslog It is certified that error appears in the above-identified patent and that said Letters Patent is hereby corrected as shown below:

Patent reads:

| Col. | Line | |
|---|---|---|
| 1 | 8-9 | "application Ser. No. 08/068,240 now U.S. Pat. No. 5,579,101 filed May 27, 1993" should read --application Ser. No. 08/068,240 filed May 27, 1993 now U.S. Pat. No. 5,519,101-- |
| 6 | 48 | "K. Ichikasa," should read --K. Ichikawa,-- |
| 9 | 36-37 | "example being methyl acrylate and methyl methacrylate," should read --examples being methyl acrylate and methyl methacrylate,-- |
| 9 | 46-47 | "a monofunctions olefinic compound," should read --a monofunctional olefinic compound,-- |
| 11 | 4-5 | "N,N'-dimethylformamide," should read --N,N-dimethylformamide,-- |

UNITED STATES PATENT AND TRADEMARK OFFICE
CERTIFICATE OF CORRECTION

PATENT NO.: 5,621,047

DATED: April 15, 1997

INVENTOR(S): Philip O. Nubel, Howard B. Yokelson, Steven A. Cohen, William G. Bouslog It is certified that error appears in the above-identified patent and that said Letters Patent is hereby corrected as shown below:

Patent reads:

| Col. | Line | | |
|------|------|---|---|
| 11 | 14 | "1,5-aentanediol," should read | --1,5-pentanediol,-- |
| 14 | 37-38 | "N,N'-dimethylformamide," should read | --N,N-dimethylformamide,-- |
| 19 | 4-5 | "in an approximate ratio of 1:1. assigned to methylene carbons" should read | --in an approximate ratio of 1:1, assigned to methylene carbons-- |
| 20 | 64 | "and ethers" should read | --said ethers-- |

Signed and Sealed this

Fifteenth Day of July, 1997

Attest:

BRUCE LEHMAN

*Attesting Officer*    *Commissioner of Patents and Trademarks*